No. 651,676. Patented June 12, 1900.
W. J. STOREY.
DRIVING MECHANISM FOR CYCLES.
(Application filed Jan. 5, 1899.)

(No Model.)

Witnesses:

Inventor
William J. Storey
By James L. Norris
Atty

UNITED STATES PATENT OFFICE.

WILLIAM JOHN STOREY, OF BALMAIN, NEW SOUTH WALES.

DRIVING MECHANISM FOR CYCLES.

SPECIFICATION forming part of Letters Patent No. 651,676, dated June 12, 1900.

Application filed January 5, 1899. Serial No. 701,271. (No model.)

*To all whom it may concern:*

Be it known that I, WILLIAM JOHN STOREY, engineer, a subject of the Queen of Great Britain, residing at No. 82 College street, Balmain, near Sydney, in the British Colony of New South Wales, have invented new and useful Improvements in Driving Mechanism for Cycles and the Like, of which the following is a specification.

This invention relates to certain improvements in driving mechanism for cycles and the like by means of which what is known as a "high gear" may be applied to cycles, specially bicycles, in a simple manner without excessive alteration of the mechanism or the frame.

In a driving mechanism constructed according to this invention the driving spindle or shaft has one or two or more offsets carrying loose miter or beveled toothed wheels gearing in a stationary miter or beveled toothed wheel and in another miter or beveled toothed wheel on the driving-sprocket or toothed wheel or pulley. The driving-spindle is carried at either end by ball-bearings which are formed in or on cheeks or side pieces which sidewardly inclose the miter or beveled wheels before mentioned. The stationary miter or beveled toothed wheel is screwed to the inside of one of the said cheeks, and the miter or beveled toothed wheel attached to the driving sprocket or wheel or pulley is carried upon ball-bearings on a thimble or sleeve extending inwardly from the other cheek. The loose miter or beveled toothed wheels run also on ball-bearings, these being on the ends of the offsets of the driving-spindle. The frame of a bicycle carrying the above-described driving-gear has its lower front stay, its diagonal or seat post, and its lower back fork terminating in the said cheeks before mentioned.

In order that this invention may be clearly understood, reference will now be made to the drawings herewith, in which—

Figure 1:
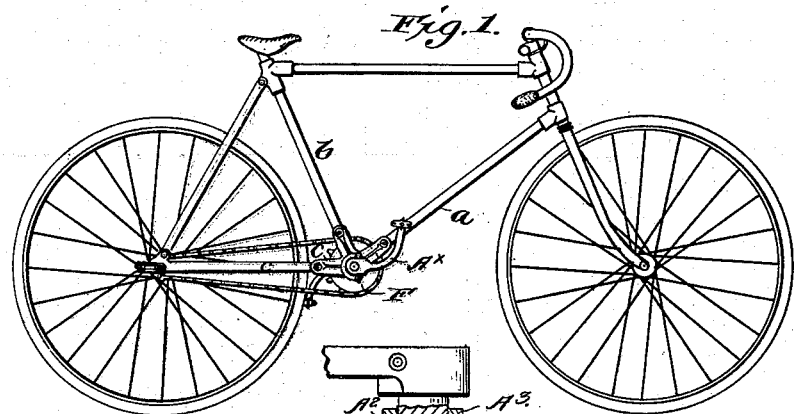
Figure 2:
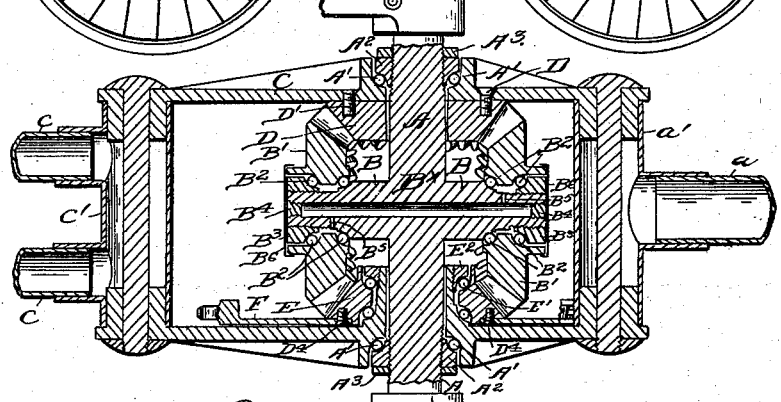
Figure 2:
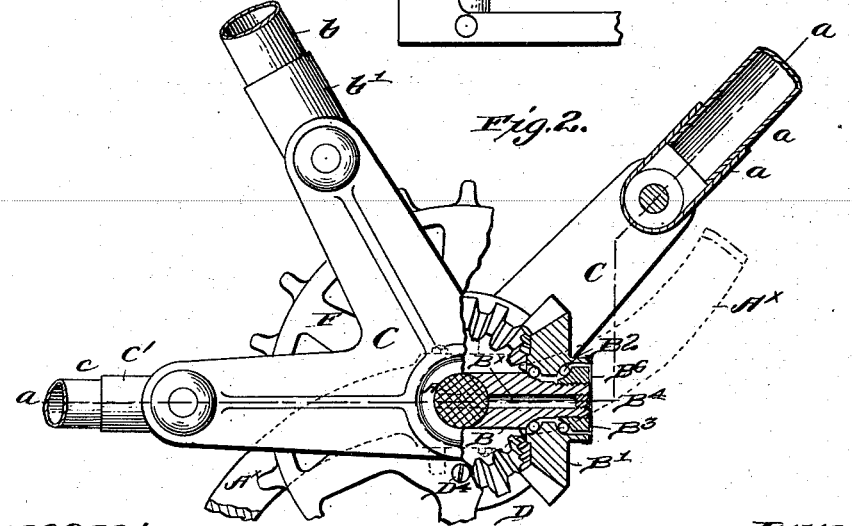

Figure 1 is an elevation showing these improvements in driving mechanism for cycles and the like applied to a safety-bicycle. Fig. 2 is a side elevation, on an enlarged scale, of these improvements; and Fig. 3 is a sectional plan on the line $a\,a$, Fig. 2.

The lower front stay $a$, the seat-post or diagonal $b$, and the lower back fork $c$ are bolted or brazed or otherwise fixed to T-pieces $a'$, $b'$, and $c'$, respectively, to which T-pieces the side cheeks C are bolted or brazed or otherwise fastened, as shown. Instead of brazing or fixing the lower back forks $c$ to the T-piece C' they might be extended right up to the bearing on the outside of the cheeks and be bolted, riveted, or brazed thereto. Through these cheek-pieces C passes the crank or pedal spindle A, having ball-bearings A', adjusting-cones A$^2$, and jam-nuts A$^3$ at either end and also having pedal-cranks A$^\times$, as well understood. This spindle A has, as shown in the drawings, two offsets B, at the outer end of which are miter or beveled toothed wheels B' on ball-bearings B$^2$, having adjusting-cones B$^3$ and caps B$^6$. From end to end of these offsets B is an oil-keep B$^\times$, access to which is obtained by unscrewing nut B$^4$ at either end, and the outlets to the bearings from which are passages or ways, (marked B$^5$.) Gearing with miter or beveled wheels B' is stationary miter or beveled wheel D, surrounding the shaft A and screwed tightly to cheek C by means of screws D', as shown. On sleeve or thimble C$^\times$, extending from the other cheek C, is miter or beveled toothed wheel E, having ball-bearings E', with adjusting-cone E$^2$. This wheel E is affixed—say by screws D$^4$—to the driving-sprocket F, from which an ordinary gear-chain carries the motion to the sprocket-pinion of the rear driving-wheel of the bicycle.

It will be seen that in use, the pedals being propelled by the feet of the rider, the spindle A, together with offsets B, is revolved, whereupon the miter or beveled toothed wheels B' will revolve edgewise circularly and will thereby be revolved circumferentially, because they gear with the stationary miter or beveled toothed wheel D. The circumferential revolution of the wheels B' will revolve the wheel E and the sprocket F, attached thereto. The edgewise revolution of the offsets B around the axis of the shaft A and the circumferential revolution of the wheels B' cause the wheel E and the sprocket F to be revolved at an increased speed in proportion to the varying diameters of the wheels E and D and of the wheels B', (when they are all miter-wheels at just double the speed of the shaft A.) Many advantages arise from this improved driving-gear—among others, that where a high gear is not required a smaller driving-sprocket may be used to attain the ordinary speed, and thus enable the cycle to be propelled with greater ease, and that where high gear or increased speed is desired the leverage of the cranks is not diminished.

Having now particularly described and ascertained the nature of my said invention and in what manner the same is to be performed, I declare that what I claim is—

In a driving-gear for cycles, the combination with the frame, and the T-shaped pieces $a'$ $b'$ $c'$, secured to said frame, of the side cheeks C secured to said T-pieces, the driving-spindle A provided with radial offsets B and having bearings in said side cheeks, the beveled toothed wheels B' loosely mounted on said offsets, an internally-projecting sleeve or thimble $C^\times$ secured to one of said side cheeks, the fixed beveled wheel D secured to the other side cheek and meshing with the wheels B', the beveled toothed wheel E mounted loosely on the thimble $C^\times$ and also meshing with the wheel B', and the sprocket-wheel F secured to and carried by the toothed wheel E, said toothed wheels being inclosed by said side cheeks, all substantially as and for the purposes described.

Dated this 3d day of December, 1898.

WILLIAM JOHN STOREY.

Witnesses:
FRED WALSH,
PERCY NEWELL.